(12) United States Patent
Kuo et al.

(10) Patent No.: US 8,330,535 B2
(45) Date of Patent: Dec. 11, 2012

(54) EQUALIZER AND METHOD OF EQUALIZING SIGNALS

(75) Inventors: Kuo-Cyuan Kuo, Tainan (TW); Yu-Chiun Lin, Taipei (TW); Ming-Kia Chen, Taoyuan County (TW)

(73) Assignee: Etron Technology, Inc., Hsinchu (TW)

( * ) Notice: Subject to any disclaimer, the term of this patent is extended or adjusted under 35 U.S.C. 154(b) by 169 days.

(21) Appl. No.: 13/052,107

(22) Filed: Mar. 20, 2011

(65) Prior Publication Data

US 2011/0291774 A1 Dec. 1, 2011

Related U.S. Application Data

(60) Provisional application No. 61/357,088, filed on Jun. 21, 2010, provisional application No. 61/350,029, filed on Jun. 1, 2010.

(30) Foreign Application Priority Data

Dec. 31, 2010 (TW) .............................. 99147195 A

(51) Int. Cl.
*H03B 1/00* (2006.01)
(52) U.S. Cl. ........ 327/551; 327/552; 327/553; 375/229; 375/231; 375/232

(58) Field of Classification Search .......... 327/551–553; 375/229–234
See application file for complete search history.

(56) References Cited

U.S. PATENT DOCUMENTS 8,149,907 B2 * 4/2012 Chou ........................... 375/232

* cited by examiner

*Primary Examiner* — Kenneth B. Wells
(74) *Attorney, Agent, or Firm* — Winston Hsu; Scott Margo

(57) ABSTRACT

An equalizer includes an oversampling logic unit, a direct current setting unit, and an alternating current setting unit. The oversampling logic unit oversamples data from a channel to generate a plurality of direct current terms and a plurality of alternating current terms according to an oversampling clock, and outputting a plurality of direct current terms corresponding to an output clock and a plurality of alternating current terms corresponding to the output clock according to the output clock. The direct current setting unit adjusts a direct current setting of the equalizer according to a plurality of direct current terms inputted by the oversampling logic unit within a first predetermined time. And the alternating current setting unit adjusts an alternating current setting of the equalizer according to a plurality of alternating current terms inputted by the oversampling logic unit within the first predetermined time.

8 Claims, 5 Drawing Sheets

EQUALIZER AND METHOD OF EQUALIZING SIGNALS

CROSS REFERENCE TO RELATED APPLICATIONS

This application claims the benefit of U.S. Provisional Application No. 61/357,088, filed on Jun. 21, 2010 and entitled "DC and AC Estimators for Equalizer Report and CDR lock indicator Report," and the benefit of U.S. Provisional Application No. 61/350,029, filed on Jun. 1, 2010 and entitled "Equalizer Using DC and AC Information," the contents of which are incorporated herein by reference.

BACKGROUND OF THE INVENTION

1. Field of the Invention

The present invention is related to an equalizer and a method of equalizing signals, and particularly to an equalizer and a method of equalizing signals that adjust a direct current setting and an alternating current setting of the equalizer according to a plurality of direct current terms and a plurality of alternating current terms generated by an oversampling logic unit.

2. Description of the Prior Art

Please refer to FIG. 1. FIG. 1 is a diagram illustrating an equalizer 100 according to the prior art. The equalizer 100 includes a direct current estimator 102, a direct current logic processor 104, an alternating current estimator 106, and an alternating current logic processor 108. After the equalizer 100 receives data from a channel, the direct current estimator 102 averages data received from the channel within a first predetermined time T1 to generate a direct current parameter, and the alternating current estimator 106 executes a discrete cosine transform and a discrete sine transform on the data received from the channel within the first predetermined time T1 to generate an alternating current parameter. The direct current logic processor 104 coupled to the direct current estimator 102 determines how to adjust a direct current setting of the equalizer 100 according to a plurality of direct current parameters within a second predetermined time T2. The alternating current logic processor 108 coupled to the alternating current estimator 106 determines how to adjust an alternating current setting of the equalizer 100 according to a plurality of alternating current parameters within the second predetermined time T2.

In the prior art, although operational principles of the equalizer 100 are based on a locked clock data recovery phase situation, in fact, the equalizer 100 receives data from the channel even when the clock data recovery phase is not locked. In addition, the direct current estimator 102 and the alternating current estimator 106 operate at a frequency of the received data. For example, the frequency of the received data is 10 GHz, and the direct current estimator 102 and the alternating current estimator 106 also operate at 10 GHz. If the data received by the equalizer are all alternating current values during a period of time, the direct current estimator 102 may determine a direct current value of the data is insufficient, resulting in increasing the direct current setting of the equalizer 100. In fact, the data received by the equalizer may all be alternating current values during the period of time, but may not be in another period of time. Thus, the direct current setting of the equalizer 100 may be incorrect.

SUMMARY OF THE INVENTION

An embodiment provides an equalizer. The equalizer includes an oversampling logic unit, a direct current setting unit, and an alternating current setting unit. The oversampling logic unit is used for executing an oversampling operation on data from a channel to generate a plurality of direct current terms and a plurality of alternating current terms according to an oversampling clock, and outputting a plurality of direct current terms corresponding to an output clock from the plurality of direct current terms and a plurality of alternating current terms corresponding to the output clock from the plurality of alternating current terms according to the output clock. The direct current setting unit is used for adjusting a direct current setting of the equalizer according to a plurality of direct current terms outputted from the oversampling logic unit within a first predetermined time. The alternating current setting unit is used for adjusting an alternating current setting of the equalizer according to a plurality of alternating current terms outputted from the oversampling logic unit within the first predetermined time.

Another embodiment provides a method of equalizing signals. The method includes executing an oversampling operation on data from a channel to generate a plurality of direct current terms and a plurality of alternating current terms according to an oversampling clock; outputting a plurality of direct current terms corresponding to an output clock from the plurality of direct current terms to a direct current setting unit and a plurality of alternating current terms corresponding to the output clock from the plurality of alternating current terms to an alternating current setting unit according to the output clock; adjusting a direct current setting of the equalizer according to a plurality of direct current terms outputted within a first predetermined time; adjusting an alternating current setting of the equalizer according to a plurality of alternating current terms outputted within the first predetermined time.

The present invention provides an equalizer and a method of equalizing signals. The equalizer and the method of equalizing the signals utilize an oversampling logic unit to execute an oversampling operation on data from a channel to generate a plurality of direct current terms and a plurality of alternating current terms. According to an output clock, the oversampling logic unit outputs a plurality of direct current terms corresponding to the output clock to a direct current setting unit and outputs a plurality of alternating current terms corresponding to the output clock to an alternating current setting unit. Therefore, the equalizer and the method of equalizing the signals do not require operation in a locked clock data recovery phase situation, and a direct current estimator and an alternating current estimator also are not required to operate at a high frequency clock. In addition, the oversampling logic unit does not get the plurality of direct current terms and the plurality of alternating current terms directly from the data like the prior art. Thus, when data received by the equalizer are all alternating current terms or all direct current terms during a period of time, the present invention retains a last alternating current term or a last direct current term received by the equalizer to improve on the mistake of the direct current setting and the mistake of the alternating current setting caused by the prior art.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
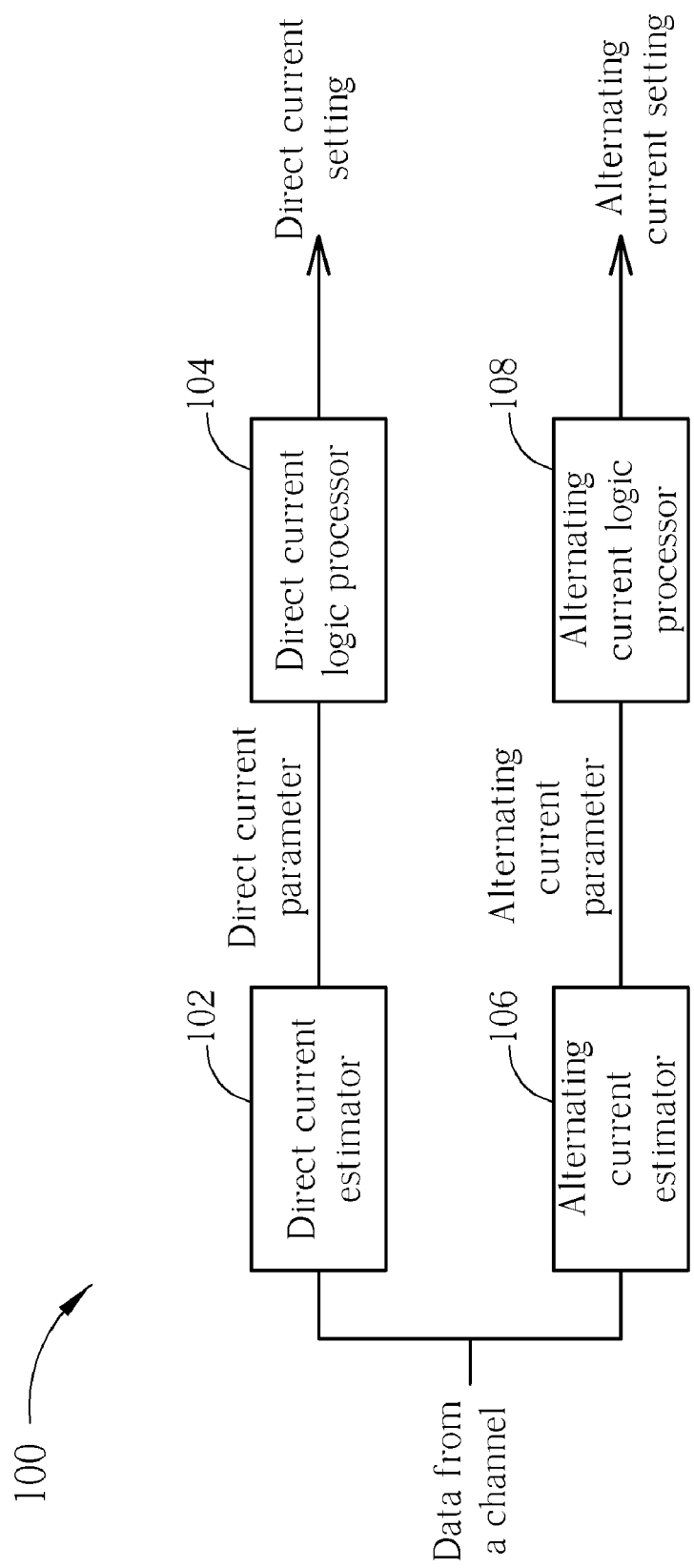
FIG. 1 is a diagram illustrating an equalizer according to the prior art.
Figure 2:
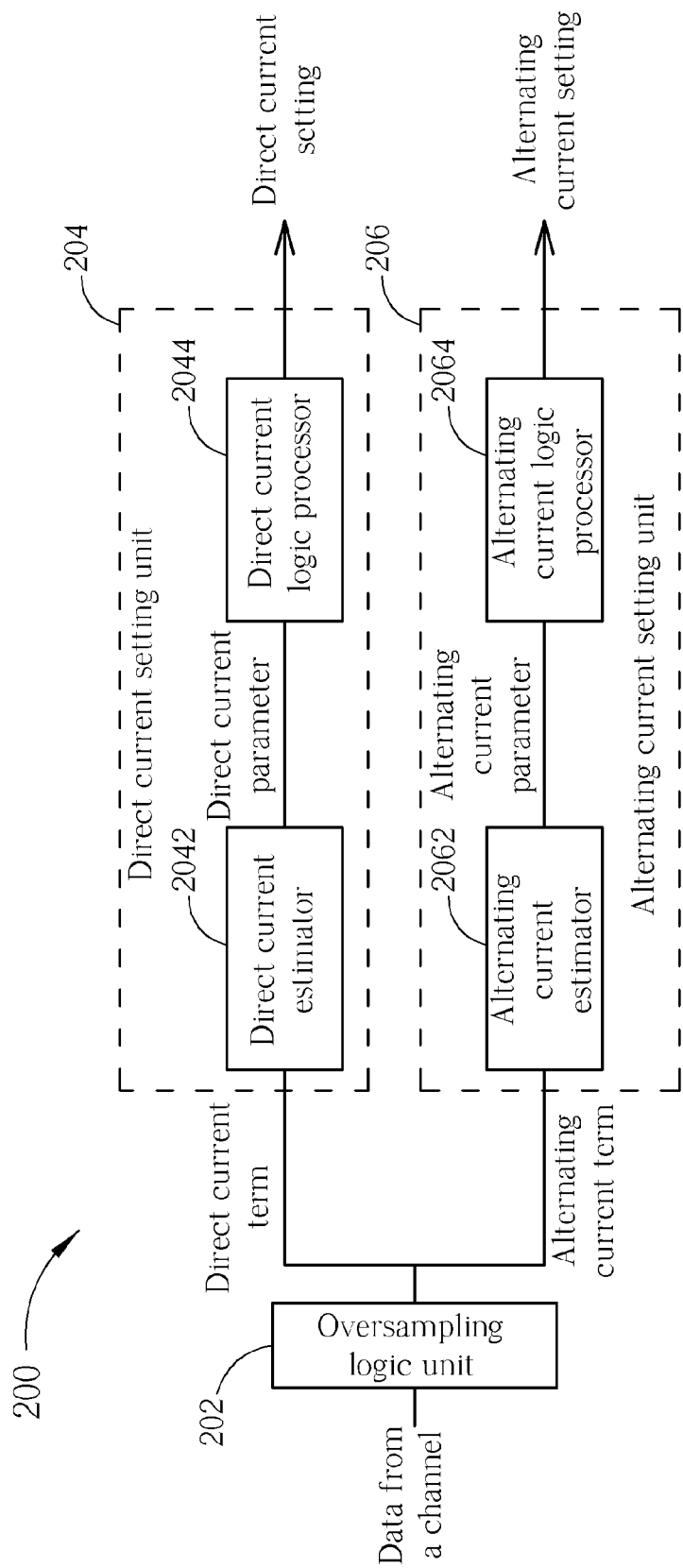
FIG. 2 is a diagram illustrating an equalizer according to an embodiment.

Please refer to FIG. 2. FIG. 2 is a diagram illustrating an equalizer 200 according to an embodiment. The equalizer 200 includes an oversampling logic unit 202, a direct current setting unit 204, and an alternating current setting unit 206. The oversampling logic unit 202 is used for executing an oversampling operation on data from a channel to generate a plurality of direct current terms and a plurality of alternating current terms according to an oversampling clock Cov, and outputting a plurality of direct current terms corresponding to an output clock Co from the plurality of direct current terms, and a plurality of alternating current terms corresponding to the output clock Co from the plurality of alternating current terms according to the output clock Co. In addition, frequency of the oversampling clock Cov is more than twice frequency of the data from the channel. In the present invention, the frequency of the oversampling clock Cov is 10 GHz and the frequency of the data from the channel is 2.5 GHz. But, the present invention is not limited to the frequency of the oversampling clock Cov being 10 GHz and the frequency of the data from the channel being 2.5 GHz.

Figure 3B:
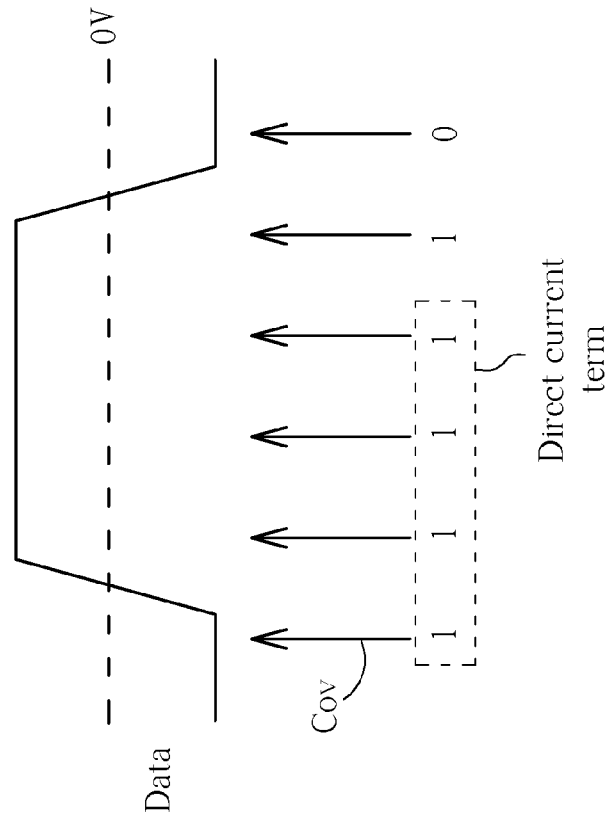
FIG. 3A and FIG. 3B are diagrams illustrating a direct current term and an alternating current term outputted from the oversampling logic unit.
Figure 3A:
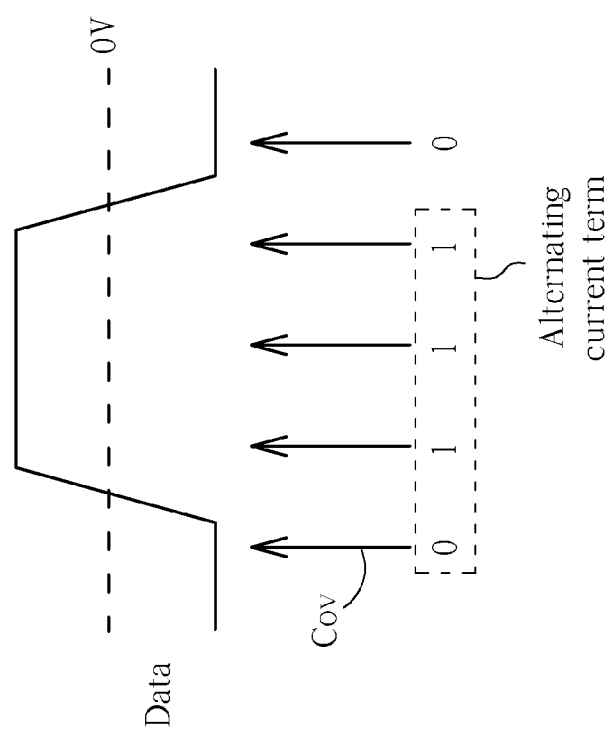
Figure 4:
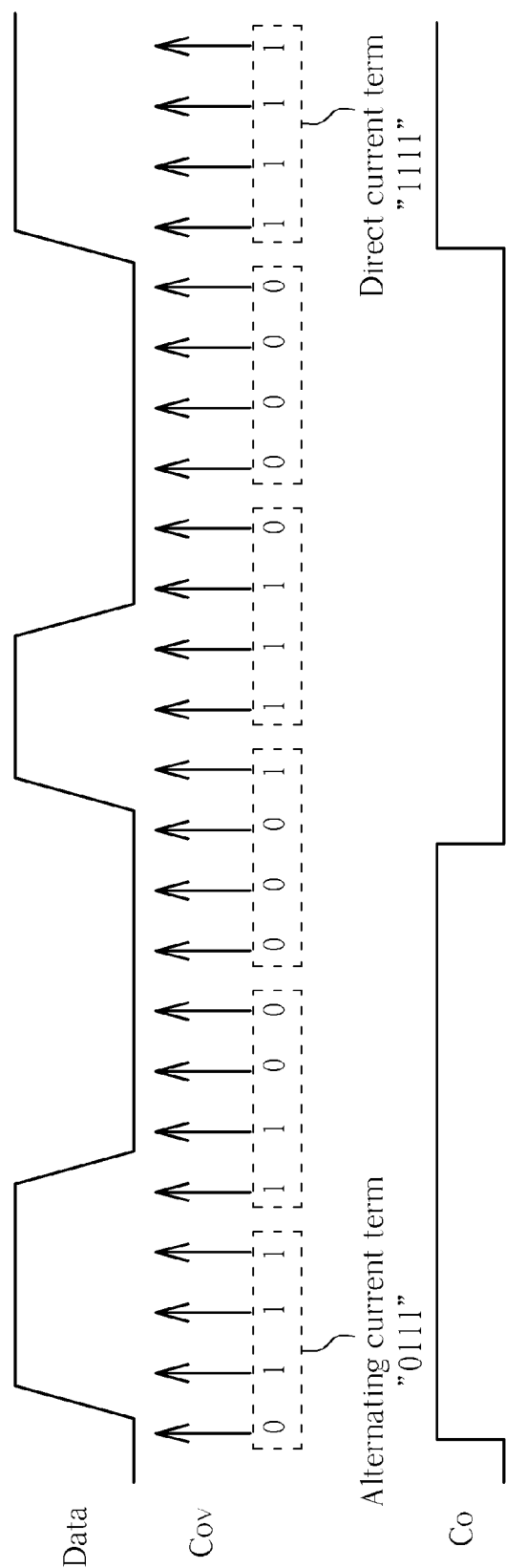
FIG. 4 is a diagram illustrating the oversampling logic unit outputting a direct current term and an alternating current term corresponding to the output clock according to the output clock.

Please refer to FIG. 3A and FIG. 3B. FIG. 3A and FIG. 3B are diagrams illustrating a direct current term and an alternating current term outputted from the oversampling logic unit 202. Because the frequency of the oversampling clock Cov is 10 GHz and the frequency of the data from the channel is 2.5 GHz, the direct current term and the alternating current term outputted from the oversampling logic unit 202 are 4-bit terms (10 GHz/2.5 GHz=4). When 4 bits of a 4-bit term are not all "0" or all "1", the oversampling logic unit 202 records the 4-bit term as an alternating current term. As shown in FIG. 3A, 4 bits of a 4-bit term is "0111", so the oversampling logic unit 202 records the 4-bit term "0111" as an alternating current term. Similarly, when 4 bits of a 4-bit term are all "0" or all "1", the oversampling logic unit 202 records the 4-bit term as a direct current term. As shown in FIG. 3B, 4 bits of a 4-bit term are "1111", so the oversampling logic unit 202 records the 4-bit term "1111" as a direct current term.

Please refer to FIG. 4. FIG. 4 is a diagram illustrating the oversampling logic unit 202 outputting a direct current term and an alternating current term corresponding to the output clock Co according to the output clock Co. The oversampling logic unit 202 continuously utilizes the oversampling clock Cov to execute the oversampling operation on the data from the channel for generating the plurality of direct current terms and the plurality of alternating current terms. However, the oversampling logic unit 202 only outputs a last recorded 4-bit term (which may be a direct current term or an alternating current term) at a positive edge of the output clock Co. But, the present invention is not limited to the oversampling logic unit 202 outputting the last recorded 4-bit term at the positive edge of the output clock Co. That is to say, the oversampling logic unit 202 can also output the last recorded 4-bit term at a negative edge of the output clock Co. Therefore, the oversampling logic unit 202 outputs the plurality of direct current terms corresponding to the output clock Co to the direct current setting unit 204, and the plurality of alternating current terms corresponding to the output clock Co to the alternating current setting unit 206 according to the output clock Co.

The direct current setting unit 204 includes a direct current estimator 2042 and a direct current logic processor 2044. The direct current estimator 2042 is coupled to the oversampling logic unit 202 for averaging a plurality of direct current terms outputted from the oversampling logic unit 202 within a first predetermined time T1 to generate a direct current parameter DCP. The direct current logic processor 2044 is coupled to the direct current estimator 2042 for determining whether a direct current value of the equalizer 200 is sufficient according to a plurality of direct current parameters DCPs within a second predetermined time T2, and adjusting a direct current setting DCS according to the plurality of direct current parameters DCPs. The alternating current setting unit 206 includes an alternating current estimator 2062 and an alternating current logic processor 2064. The alternating current estimator 2062 is coupled to the oversampling logic unit 202 for executing a discrete cosine transform and a discrete sine transform on a plurality of alternating current terms outputted from the oversampling logic unit 202 within the first predetermined time T1 to generate an alternating current parameter ACP. The alternating current logic processor 2064 is coupled to the alternating current estimator 2062 for determining whether an alternating current value of the equalizer 200 is sufficient according to a plurality of alternating current parameters ACPs within the second predetermined time T2 and adjusting an alternating current setting ACS according to the plurality of alternating current parameters ACPs.

Figure 5:
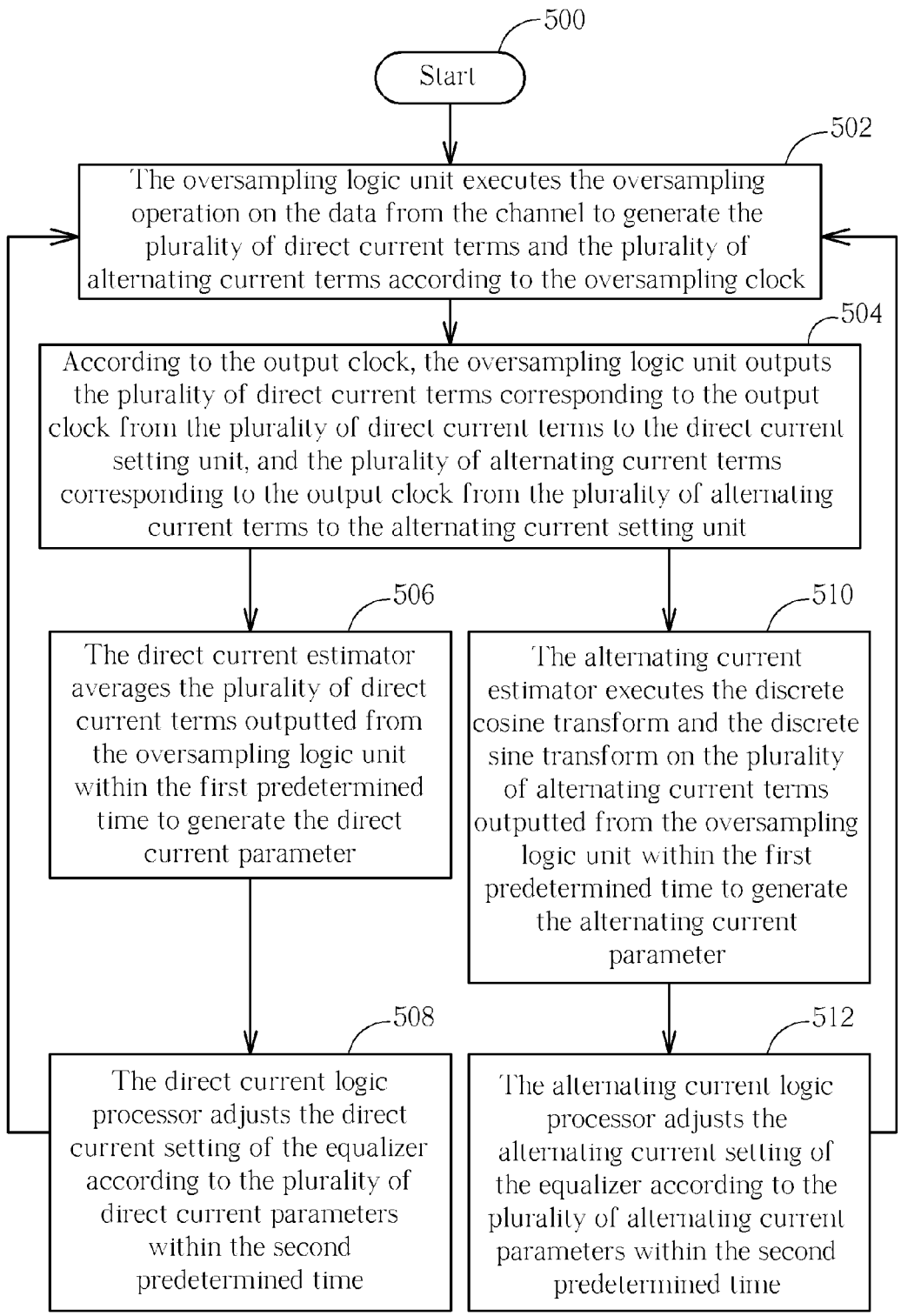
FIG. 5 is a flowchart illustrating a method of equalizing signals according to another embodiment.

Please refer to FIG. 5. FIG. 5 is a flowchart illustrating a method of equalizing signals according to another embodiment. FIG. 5 uses the equalizer 200 in FIG. 2 to illustrate the method. Detailed steps are as follows:

Step 500: Start.

Step 502: The oversampling logic unit 202 executes the oversampling operation on the data from the channel to generate the plurality of direct current terms and the plurality of alternating current terms according to the oversampling clock Cov.

Step 504: The oversampling logic unit 202 outputs the plurality of direct current terms corresponding to the output clock Co from the plurality of direct current terms to the direct current setting unit 204 according to the output clock Co; go to Step 506; the plurality of alternating current terms corresponding to the output clock Co from the plurality of alternating current terms are outputted to the alternating current setting unit 206 according to the output clock Co; go to Step 510.

Step 506: The direct current estimator 2042 averages the plurality of direct current terms outputted from the oversampling logic unit 202 within the first predetermined time T1 to generate the direct current parameter DCP.

Step 508: The direct current logic processor 2044 adjusts the direct current setting DCS of the equalizer 200 according to the plurality of direct current parameters DCPs within the second predetermined time T2; go to Step 502.

Step 510: The alternating current estimator 2062 executes the discrete cosine transform and the discrete sine transform on the plurality of alternating current terms outputted from the oversampling logic unit 202 within the first predetermined time T1 to generate the alternating current parameter ACP.

Step 512: The alternating current logic processor 2064 adjusts the alternating current setting ACS of the equalizer

200 according to the plurality of alternating current parameters ACPs within the second predetermined time T2; go to Step 502.

In Step 502, the frequency of the oversampling clock Cov is more than twice the frequency of the data from the channel. In FIG. 5, the frequency of the oversampling clock Cov is 10 GHz and the frequency of the data is 2.5 GHz. But, the present invention is not limited to the frequency of the oversampling clock Cov being 10 GHz and the frequency of the data from the channel being 2.5 GHz. In Step 504, according to the positive edge or the negative edge of the output clock Co, the oversampling logic unit 202 outputs the plurality of direct current terms corresponding to the output clock Co to the direct current setting unit 204, and outputs the plurality of alternating current terms corresponding to the output clock Co to the alternating current setting unit 206. In Step 508, the direct current logic processor 2044 determines whether the direct current value of the equalizer 200 is sufficient according to the plurality of direct current parameters DCPs within the second predetermined time T2, and adjusts the direct current setting DCS according to the plurality of direct current parameters DCPs. In Step 512, the alternating current logic processor 2064 determines whether the alternating current value of the equalizer 200 is sufficient according to the plurality of direct current parameters ACPs within the second predetermined time T2, and adjusts the alternating current setting ACS according to the plurality of direct current parameters ACPs.

To sum up, the equalizer and the method of equalizing the signals utilizes the oversampling logic unit to execute the oversampling operation on the data from the channel to generate the plurality of direct current terms and the plurality of alternating current terms. And, according to the output clock, the oversampling logic unit outputs the plurality of direct current terms corresponding to the output clock to the direct current setting unit and outputs the plurality of alternating current terms corresponding to the output clock to the alternating current setting unit. Therefore, the equalizer of the present invention does not require operation in a locked clock data recovery phase situation, and the direct current estimator and the alternating current estimator also are not required to operate at a high frequency clock. In addition, the oversampling logic unit does not get the plurality of direct current terms and the plurality of alternating current terms directly from the data like the prior art. Thus, when data received by the equalizer are all alternating current terms or all direct current terms during a period of time, the present invention retains a last alternating current term or a last direct current term received by the equalizer to improve on the mistake of the direct current setting and the mistake of the alternating current setting caused by the prior art.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An equalizer, comprising:
    an oversampling logic unit for executing an oversampling operation on data from a channel to generate a plurality of direct current terms and a plurality of alternating current terms according to an oversampling clock, and outputting a plurality of direct current terms corresponding to an output clock from the plurality of direct current terms and a plurality of alternating current terms corresponding to the output clock from the plurality of alternating current terms according to the output clock;
    a direct current setting unit for adjusting a direct current setting of the equalizer according to a plurality of direct current terms outputted from the oversampling logic unit within a first predetermined time; and
    an alternating current setting unit for adjusting an alternating current setting of the equalizer according to a plurality of alternating current terms outputted from the oversampling logic unit within the first predetermined time.

2. The equalizer of claim 1, wherein the direct current setting unit comprises:
    a direct current estimator coupled to the oversampling logic unit for averaging the plurality of direct current terms outputted from the oversampling logic unit within the first predetermined time to generate a direct current parameter; and
    a direct current logic processor coupled to the direct current estimator for adjusting the direct current setting according to a plurality of direct current parameters.

3. The equalizer of claim 1, wherein the alternating current setting unit comprising:
    an alternating current estimator coupled to the oversampling logic unit for executing a discrete cosine transform and a discrete sine transform on the plurality of alternating current terms outputted from the oversampling logic unit within the first predetermined time to generate an alternating current parameter; and
    an alternating current logic processor coupled to the alternating current estimator for adjusting the alternating current setting according to a plurality of alternating current parameters.

4. The equalizer of claim 1, wherein a frequency of the oversampling clock is more than twice a frequency of the data from the channel.

5. A method of equalizing signals, the method comprising:
    executing an oversampling operation on data from a channel to generate a plurality of direct current terms and a plurality of alternating current terms according to an oversampling clock;
    outputting a plurality of direct current terms corresponding to an output clock from the plurality of direct current terms to a direct current setting unit and a plurality of alternating current terms corresponding to the output clock from the plurality of alternating current terms to an alternating current setting unit according to the output clock;
    adjusting a direct current setting of the equalizer according to a plurality of direct current terms outputted within a first predetermined time; and
    adjusting an alternating current setting of the equalizer according to a plurality of alternating current terms outputted within the first predetermined time.

6. The method of claim 5, wherein adjusting the direct current setting of the equalizer according to the plurality of direct current terms outputted within the first predetermined time comprises:
    averaging the plurality of direct current terms outputted within the first predetermined time to generate a direct current parameter; and
    adjusting the direct current setting according to a plurality of direct current parameters.

7. The method of claim 5, wherein adjusting the alternating current setting of the equalizer according to the plurality of alternating current terms outputted within the first predetermined time comprises:

executing a discrete cosine transform and a discrete sine transform on the plurality of alternating current terms outputted within the first predetermined time to generate an alternating current parameter; and adjusting the alternating current setting according to a plurality of alternating current parameters.

8. The method of claim 5, wherein a frequency of the oversampling clock is more than twice a frequency of the data from the channel.

* * * * *